F. HIERGESELL.
BURETTE.
APPLICATION FILED SEPT. 25, 1918.
1,314,265.  Patented Aug. 26, 1919.
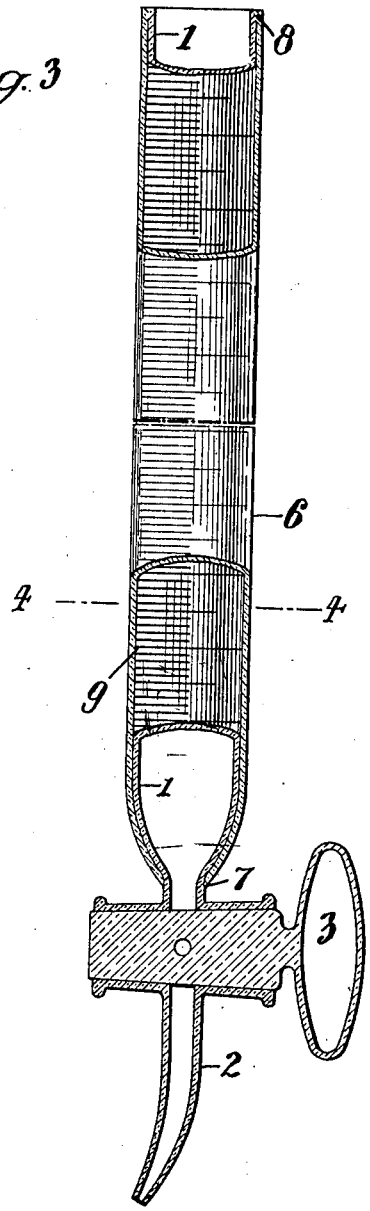
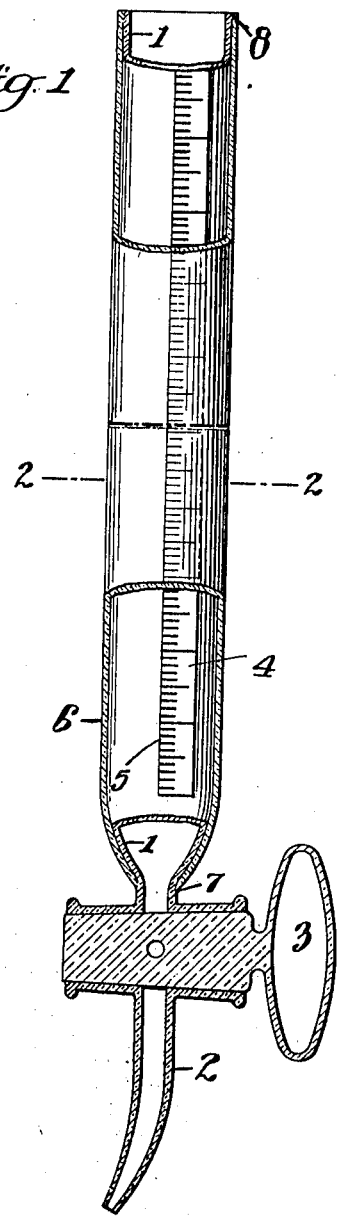
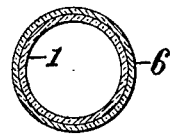
Inventor
Frederick Hiergesell
By his Attorney

UNITED STATES PATENT OFFICE.

FREDERICK HIERGESELL, OF NEW YORK, N. Y.

BURETTE.

1,314,265.　　　　Specification of Letters Patent.　　Patented Aug. 26, 1919.

Application filed September 25, 1918. Serial No. 255,720.

*To all whom it may concern:*

Be it known that I, FREDERICK HIERGESELL, a citizen of Germany, and a resident of New York city, in the county and State of New York, have invented certain new and useful Improvements in Burettes, of which the following is a specification.

This invention relates to a burette of novel construction and more particularly to novel and efficient means for applying the scale alongside the body thereof, and protecting the same against acids and other deleterious agents.

In the accompanying drawings:—

Figure 1 is a longitudinal section partly in side view of a burette embodying my invention;

Fig. 2 a cross section on line 2—2 of Fig. 1;

Fig. 3, a longitudinal section partly in side view of a modification, and

Fig. 4, a cross section on line 4—4 of Fig. 3.

The glass tube 1 constituting the body of the burette is open on top, and runs out at its lower end into a nozzle 2, controlled by a stop cock 3, all as usual. To the face of tube 1, is pasted a strip 4 of paper or other flexible material bearing a scale 5. In order to inclose and protect the scale, tube 1 is surrounded by a second glass tube constituting a transparent casing 6, through which the scale, which is confined between the tubes, is visible. Casing 6 is curved at its bottom in parallelism with the rounded bottom of tube 1, to which it is fused as at 7 so that the nozzle 2 protrudes from the fused end of the casing. The upper end of the latter is straight, and is fused to the corresponding end of tube 1 as at 8. If desired, tubes 1 and 6 may be slightly distanced to form an intervening space from which the air is exhausted, in order to maintain the liquid passing through the burette, at an even temperature.

In manufacturing the device, a cylindrical glass tube is projected over the body of the burette, its lower end is heated, contracted and rounded and both ends are fused to the burette body as previously stated.

The strip 4 should be mounted in such a manner that its reading edge is coincident with the axis of the nozzle 2. Thus when the burette is charged, such reading edge will be in line with the bottom of the meniscus of the liquid when the apparatus is held in the position shown in the drawing so that an accurate reading may be had.

With the embodiment illustrated in Figs. 3 and 4, the strip 4 is omitted, the scale 9 being marked directly upon the body of tube 1.

It will be seen that by the construction described, the scale is incased in such a manner as to be effectively protected against acids or abrasion, and that at the same time, the body of the burette is reinforced to a desirable extent, while the nozzle and stop cock remain unencumbered.

Moreover, if the scale is applied by means of the incased strip 4, the application of the graduations to the burette is greatly simplified and cheapened.

I claim:

1. A burette comprising a glass tube open at one end and having a cock-controlled nozzle at the other end, a scale and a glass casing surrounding said tube and inclosing said scale, said casing having its opposite ends flush with the open end of said tube and with the inner end of said nozzle respectively and being fused to said tube only at these points.

2. A burette comprising a glass tube having a cock-controlled nozzle at one end, a transparent casing surrounding said tube and terminating at the inner end of said nozzle, said casing and tube being connected only at the opposite ends of said casing and a scale located between said tube and casing and having its indicating edge in registry with the axis of said tube.

3. A burette comprising a glass tube having a cock-controlled nozzle at one end, a transparent casing surrounding said tube and connected therewith, and a graduated scale strip interposed between said tube and casing and located entirely to one side of the axis of said tube with its indicating edge in registry with said axis.

FREDERICK HIERGESELL.